(12) United States Patent
Albert et al.

(10) Patent No.: US 6,324,449 B2
(45) Date of Patent: Nov. 27, 2001

(54) CONTROL DEVICE FOR AN ELECTRIC ENGINE DRIVEN VEHICLE

(75) Inventors: Michael Albert, Bischbrunn; Thomas Reckhorn, Rottendorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/810,669

(22) Filed: Mar. 19, 2001

Related U.S. Application Data

(63) Continuation of application No. PCT/DE99/02818, filed on Sep. 6, 1999.

(30) Foreign Application Priority Data

Sep. 17, 1998 (DE) .............................................. 198 42 509

(51) Int. Cl.$^7$ .................................................. B60R 16/02
(52) U.S. Cl. ................ 701/22; 701/87; 701/51; 180/165; 290/40 A; 290/40 R
(58) Field of Search ................ 701/22, 87, 51, 701/54; 180/165; 290/40 R, 40 A

(56) References Cited

U.S. PATENT DOCUMENTS

| | | | |
|---|---|---|---|
| 5,676,111 | * 10/1997 | Zhang | 123/325 |
| 5,954,779 | 9/1999 | Dietzel . | |
| 6,188,945 | * 2/2001 | Graf et al. | 701/58 |
| 6,216,067 | * 4/2001 | Baeuerle et al. | 701/29 |

FOREIGN PATENT DOCUMENTS

| | | |
|---|---|---|
| 43 24 010 C2 | 1/1995 | (DE) . |
| 0 846 590 A2 | 6/1998 | (EP) . |

* cited by examiner

*Primary Examiner*—William A. Cuchlinski, Jr.
*Assistant Examiner*—Olga Hernandez
(74) *Attorney, Agent, or Firm*—Sughrue, Mion, Zinn, Macpeak & Seas, PLLC

(57) ABSTRACT

To recreate the familiar vehicle behavior of vehicles with internal combustion engines, a simulated engine drag torque is provided through controlled braking of the electric engine after release of the accelerator pedal or the brake pedal. To increase the driving comfort and, in addition, to save energy carried on board in the vehicle's energy storage device, the simulated engine drag torque sets in only upon reaching a minimum threshold value of a speed increase after the accelerator pedal or the brake pedal is released.

21 Claims, 3 Drawing Sheets

US 6,324,449 B2

CONTROL DEVICE FOR AN ELECTRIC ENGINE DRIVEN VEHICLE

This is a Continuation of International Application PCT/DE99/02818, with an international filing date of Sep. 6, 1999, which was published under PCT Article 21(2) in German, and the disclosure of which is incorporated into this application by reference.

FIELD OF AND BACKGROUND OF THE INVENTION

The invention relates to a control device for a vehicle that is propelled by an electric engine. Such control devices are provided both for vehicles driven solely by an electric engine as well as for vehicles with a hybrid drive.

Vehicles driven by internal combustion engines are usually distinguished by a retarding action exerted on the vehicle due to an engine drag torque during coasting when the accelerator or brake pedal is released and the internal combustion engine is not de-coupled from the transmission by a clutch.

OBJECTS OF THE INVENTION

One object of the present invention is to offer the driver this type of familiar vehicle behavior even if the vehicle is partially or solely propelled by an electric engine. A related object is to provide the driver with increased driving comfort even while limiting or minimizing the amount of energy consumed from the energy storage device of the vehicle. Related control devices for vehicles propelled by an electric engine are known from, e.g., German Patent DE 43 24 010 C2 and European Laid-Open Publication EP-A 0 846 590 (which has a counterpart U.S. Pat. No. 5,954,779). The disclosures of these three related art references are incorporated into the present application by reference.

SUMMARY OF THE INVENTION

According to one formulation of the invention, this and other objects are attained by a control device for a vehicle driven by an electric engine:

with a simulated engine drag torque achieved by controlling the electric engine upon release of the previously actuated accelerator pedal or the previously actuated brake pedal of the vehicle, wherein the electric engine is controlled through an engine brake current ($I_B=f(n;v)$) or analogous parameter, such that the current or analogous parameter varies in accordance with a respective engine speed (n) or vehicle speed (v), and wherein onset of the current or analogous parameter is dependent on reaching a minimum value of an increase in engine speed or vehicle speed (or a minimum acceleration value of the engine speed or vehicle speed) after release of the accelerator pedal or the brake pedal.

It is possible to simulate an engine drag torque familiar to the driver of a vehicle that is driven solely by an internal combustion engine. This is done by providing an engine brake current (or analogous parameter) upon release of the accelerator pedal or brake pedal, and making this engine brake current a function of the vehicle speed or the engine rpm in accordance with a predefinable characteristic. Further, in order to increase the driving comfort and in addition particularly to save the energy carried on board in the energy storage device, the onset of the simulated engine drag torque is set to commence upon a parameter reaching a predefined minimum threshold above the parameter value that exists after release of the accelerator pedal or release of the brake pedal. The parameter and the minimum threshold value thereof can be, e.g., of any of the following: a required increase in engine rpm or in vehicle speed, or a required engine speed acceleration or vehicle speed acceleration, compared to the engine speed or vehicle speed that is present after release of the accelerator pedal or brake pedal. Due to this engine brake characteristic being re-definable in adaptation to the minimum differential threshold values, or the onset of the engine drag torque being thus redefinable, these control values are a function of the actual engine speed or vehicle speed that is present after the accelerator pedal or brake pedal has been released. This occurs in such a way that external acceleration or deceleration forces acting on the vehicle (e.g., an upward or downward slope of the roadway or special wind conditions, or the nature of the road surface), which also affect the vehicle's acceleration or deceleration after the release of the accelerator pedal or brake pedal, are advantageously taken into account.

In such situations, the invention thus avoids, on the one hands additional deceleration by a simulated engine drag torque, which in itself is not necessary or desirable. This prevents impairment of the driving comfort, since the driver may, depending on the situation, attempt to compensate for the unintended excessive deceleration by renewed actuation of the accelerator pedal. It further avoids, in particular, the unnecessary usage of the energy carried on board in the vehicle's energy storage device that would arise from the undesirably strong deceleration or the subsequent acceleration of the vehicle. It is preferable to have the utilization of the kinetic energy of the vehicle be as exact as possible, without resort to regenerative braking, More specifically, the vehicle's energy consumption is optimized by advantageously expanding the vehicle's electric range, rather than recuperating the braking energy, regardless of the specific recuperation method employed, since the recuperation process is always connected with electric losses due to inefficiencies in the recovery processes. According to the invention, any such undesirable excessive braking or re-acceleration is advantageously avoided, however, because the onset of the simulated engine drag torque is made to depend on reaching a minimum threshold value of (i) an engine rpm increase, (ii) a vehicle speed increase, (iii) an engine acceleration or (iv) vehicle acceleration. Reaching the minimum threshold value is factored from the speed of the engine or the speed of the vehicle at the time of or subsequent to the release of the accelerator pedal or brake pedal.

On the other hand, the invention provides a simulated engine drag torque that prevents the vehicle from accelerating due to external forces after the accelerator pedal or brake pedal is released. This makes it possible generally to counteract any external acceleration or deceleration forces acting on the vehicle after the release of the accelerator pedal or brake pedal.

Advantageously, the engine brake characteristic is selected so that the engine drag torque sets in only at engine speeds or vehicle speeds above a certain minimum engine speed or minimum vehicle speed. This has the advantage in particular of avoiding unchecked control fluctuations. According to a preferred embodiment of the invention, the brake current characteristic as a function of the electric engine speed or the vehicle speed is selected such that the brake current initially increases and, after reaching a predefined maximum engine brake current, remains essentially constant. The rate of the increase in the brake current in the first speed range is preferably constant. However, this rate of increase in the brake current in the first speed range and/or the absolute value of the maximum brake current can instead be variable, i.e. a function of additional parameters.

BRIEF DESCRIPTION OF THE DRAWINGS

The invention as well as specific advantageous embodiments thereof will now be described in greater detail by way of schematic examples with reference to the drawing in which.

DETAILED DESCRIPTION OF THE PREFERRED EMBODIMENTS

Figure 1:
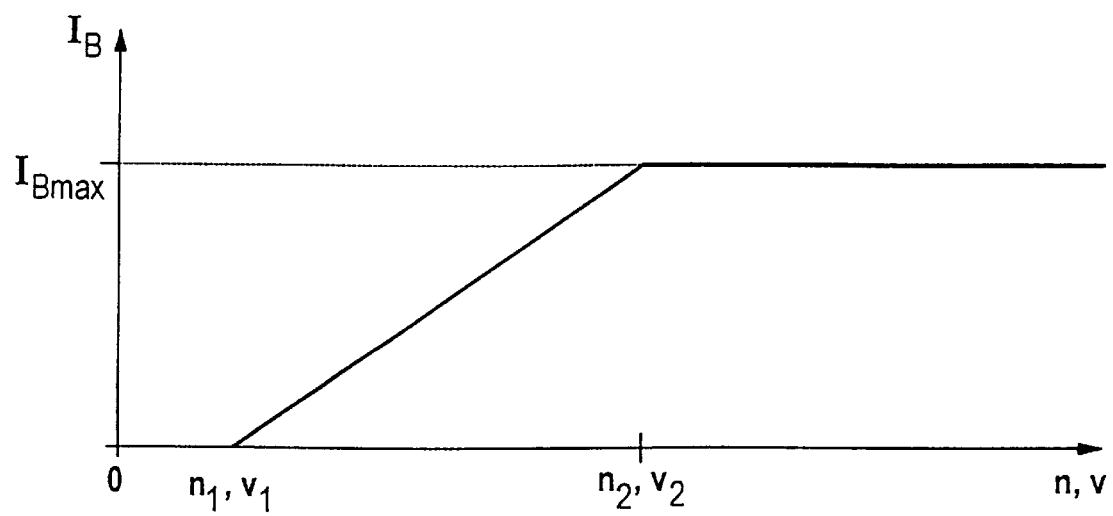
FIG. 1 is a characteristic, by way of example, of the engine brake current to adjust a drag torque as a function of the engine speed or the vehicle speed.

FIG. 1 shows the characteristic of the brake current $I_B$ as a function of the electric engine speed n or the vehicle speed v starting at an engine speed $n_1$ or a vehicle speed $v_1$. The characteristic of the brake current as a function of the engine speed n or the vehicle speed v is selected, according to one embodiment of the invention, such that the brake current, and thus the engine drag torque it simulates, initially increases, preferably continuously, up to a maximum engine brake current $I_{Bmax}$ at an engine speed $n_2$ or a vehicle speed $v_2$ and then remains constant.

Figure 2:
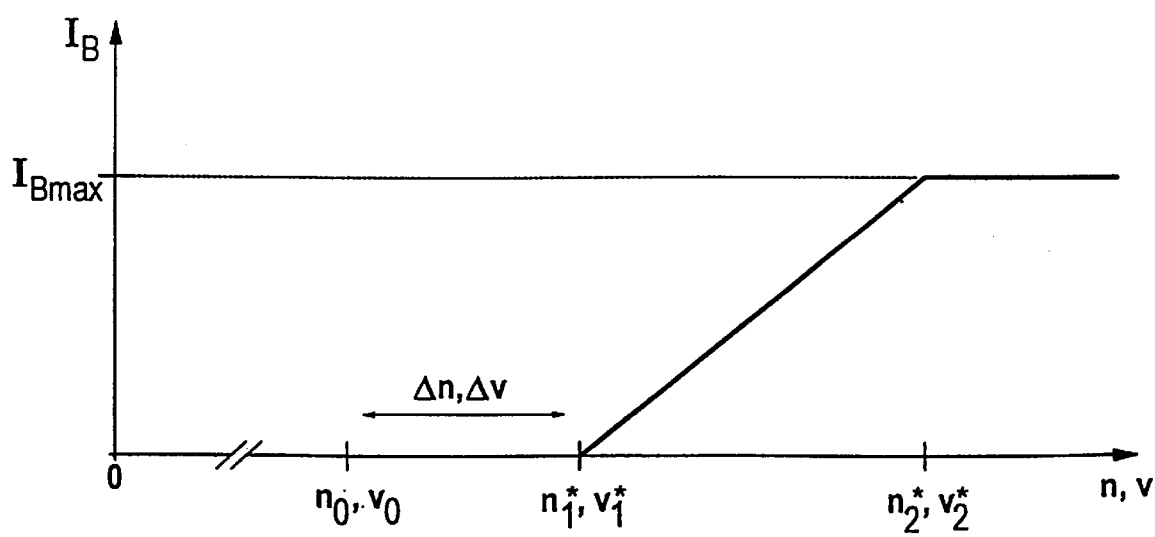
FIG. 2 shows the onset of the brake current only after a minimum threshold value of a rpm or speed increase is attained following release of the accelerator pedal.

FIG. 2 shows a simulated engine drag torque in which increased driving comfort and a simultaneous saving of energy carried in the vehicle energy storage device is made possible. This is accomplished in that the brake current $I_B$ and thus the start of the engine drag torque sets in only after a minimum threshold value for a difference in the engine speed $\Delta n$ or the vehicle speed $\Delta v$. This allows other external factors affecting the vehicle after the release of the accelerator pedal or the brake pedal to be taken into account. Thereby, utilization of the vehicle's kinetic energy is optimized, without needing to relinquish the beneficial simulation of an engine drag torque in desired situations. This is made possible in that the engine speed no or vehicle speed $v_0$ present after the release of the accelerator pedal is assessed (e.g. stored in memory) and the onset of the simulated engine drag torque is shifted to an engine speed point $n_1^*$ or vehicle speed point $v_1^*$. The minimum threshold values of the increase, i.e., the differential values $\Delta n$ of the engine speed or $\Delta v$ of the vehicle speed can be freely parameterized. In the embodiment, the maximum brake current $I_{Bmax}$ is then reached at a higher engine speed $n_2^*$ or a higher vehicle speed $v_2^*$.

Figure 3:
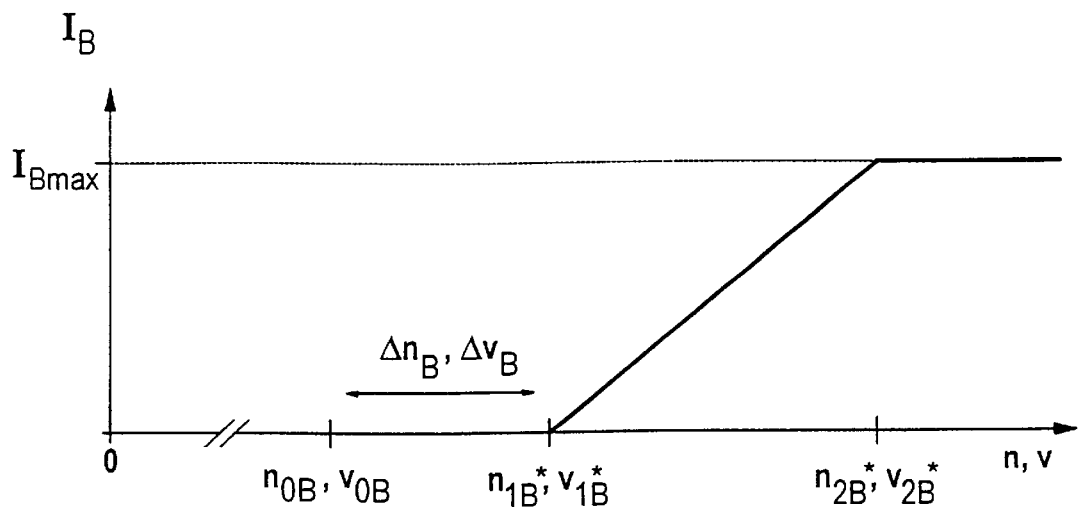
FIG. 3 shows the onset of the brake current only after a minimum threshold value of a rpm or speed increase is attained following release of the brake pedal.

Similarly to what has been described above with reference to FIG. 2 for releasing the accelerator pedal, a corresponding adaptation of the onset of the engine brake current and thus the simulated engine drag torque is provided also upon the release of a previously actuated brake pedal, according to a further embodiment of the invention, which is described with reference to FIG. 3. To this end, the engine speed $n_{OB}$ or vehicle speed $V_{OB}$ present when the brake pedal is released is again stored. The engine brake characteristic is then again shifted by a freely parameterizable amount $\Delta n_B$ or $\Delta v_B$ to onset point $n_{1B}^*$ or $v_{1B}^*$, with the maximum brake current being reached at $n_{2B}^*$ or $V_{2B}^*$. As a result, even after the brake pedal is released, it is possible to achieve the increased driving comfort described in connection with the release of the accelerator pedal and simultaneously to conserve the energy carried on board. According to the invention, the triggering of the simulated engine drag torque is a function of reaching a minimum value of an engine speed increase or a vehicle speed increase after release of, in this case, the brake pedal.

Figure 4:
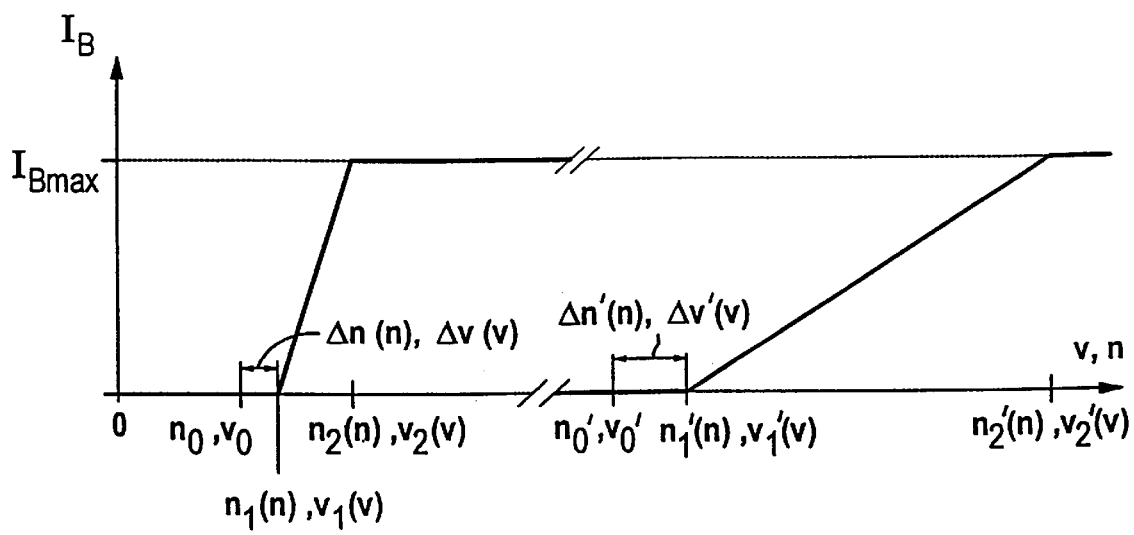
FIG. 4 illustrates the minimum threshold value of the engine speed and the vehicle speed increase or the brake current increase variable as a function of the electric engine rpm or the vehicle speed after the accelerator pedal or the brake pedal has been released.

FIG. 4 shows an additional exertion of influence on the engine brake characteristic in such a way that (i) the increase in the brake current $I_B$, i.e., its increase per unit of speed (rpm or vehicle speed), and/or (ii) the minimum engine speed increase An or the minimum theshold vehicle speed increase $\Delta v$ required prior to onset of the simulated engine drag torque is made dependent on the corresponding engine speed or vehicle speed present after the accelerator pedal or the brake pedal has been released. For example, the left portion of FIG. 4 shows a steeper increase in the brake current $I_B$ and a lesser minimum threshold rpm increase $\Delta n$ or minimum threshold speed increase $\Delta v$ at a lower engine speed no or vehicle speed $v_0$. On the right, FIG. 4 shows a flatter increase in the brake current and a greater minimum threshold rpm increase $\Delta n'$ or minimum threshold speed increase $\Delta v'$ if the accelerator pedal or brake pedal is released at a higher engine speed $n_0'$ or vehicle speed $v_0'$.

According to further embodiments of the invention, the maximum brake current $I_{Bmax}$, which is assumed to be at a constant level in the embodiments shown in the drawings, may also vary as a function of the respective engine speed $n_0$ or vehicle speed $v_0$ following release of the accelerator pedal or brake pedal. As a further, alternative parameter for defining the corresponding brake characteristic, instead of the engine speed or vehicle speed present after the accelerator pedal or brake pedal is released, the corresponding acceleration value, i.e., the rpm increase or speed increase per unit of time, may be used as a basis.

Figure 5:
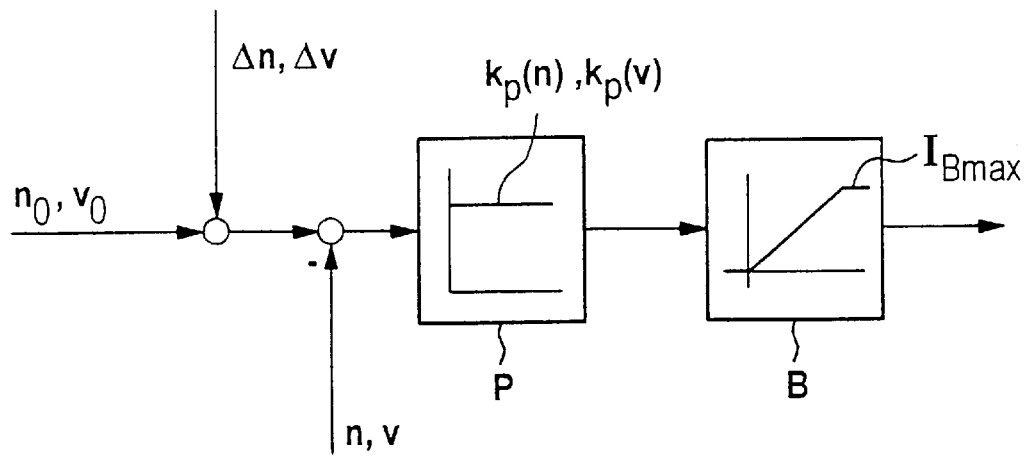
FIG. 5 is a block diagram of circuitry wherein the engine drag torque is adjusted by means of a proportional action controller.
Figure 6:
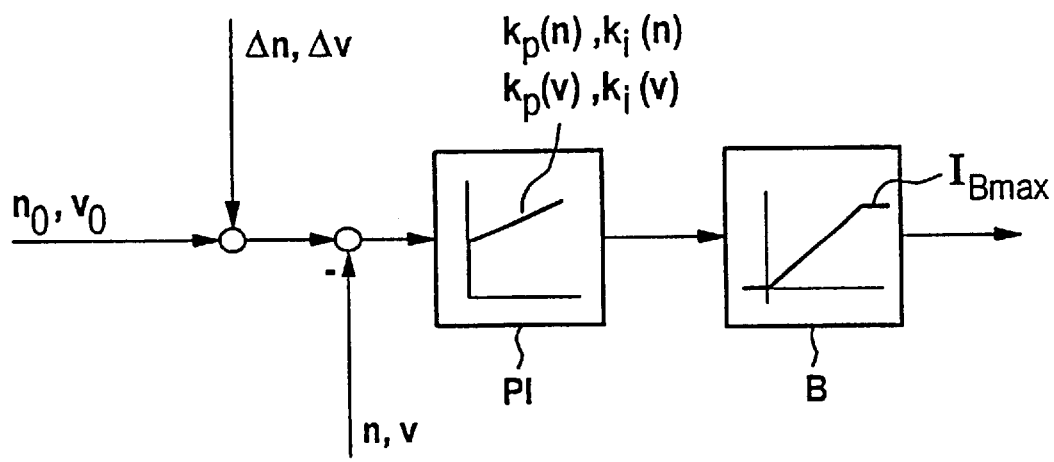
FIG. 6 is a block diagram of circuitry wherein the engine drag torque is adjusted by means of a proportional-plus-integral controller.

FIGS. 5 and 6 are schematic block diagrams showing two exemplary embodiments for determining the parameters of brake current $I_B$ as a function of the engine speed n or the vehicle speed v. In the case of FIG. 5, the determination is carried out by means of a proportional action controller P with current limiter B; in the case of FIG. 6, a proportional-plus-integral controller PI with current limiter B are used. Controllers P and PI each receive their corresponding setpoints from the sum of (i) the engine speed no or vehicle speed $v_0$ present when the accelerator pedal or brake pedal is released and (ii) the minimum threshold engine speed increase $\Delta n$ or minimum threshold vehicle speed increase $\Delta v$. The actual (i.e. measured) value supplied to controllers P and PI is the absolute value of the engine speed n or of the vehicle speed v. The outputs of the controllers P and PI are limited, respectively, by a current limiter B to the maximum engine brake current $I_{Bmax}$. The amplification factors $k_p$ and $k_i$ of the respective controllers P and PI are used to define the rate of the increase in the brake current $I_B$ (cf., e.g., FIG. 4).

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Control device for a vehicle propelled by an electric engine, providing:
    a simulated engine drag torque through control of the electric engine upon release of a previously actuated accelerator pedal or a previously actuated brake pedal of the vehicle,
    a characteristic of the simulated engine drag torque as a function of an engine brake current ($I_B$) or a parameter algebraically proportional to the engine brake current, wherein the engine brake current or the algebraically proportional parameter is variable with respect to at least one of an engine speed (n) or a vehicle speed (v), and
    an onset of the simulated engine drag torque as a function of reaching a minimum, non-zero threshold value of an engine speed increase ($\Delta n$) or a vehicle speed increase ($\Delta v$) after release of the accelerator pedal or the brake pedal.

2. Control device as claimed in claim 1, wherein at least one of the following is variable with respect to either an absolute value of the engine speed ($n_0$) or an absolute value of the vehicle speed ($v_0$) after release of the accelerator pedal or the brake pedal:
    the onset of the simulated engine drag torque,
    the minimum threshold value of the engine speed increase ($\Delta n$),
    the vehicle speed increase ($\Delta v$),
    a rate of the increase in the engine brake current ($I_B$), or
    a maximum value ($I_{Bmax}$) of the engine brake current.

3. Control device as claimed in claim 2, comprising:
    a proportional action controller that adjusts the simulated engine drag torque as a function of at least one of the following:
    the engine speed increase ($\Delta n$),
    the vehicle speed increase ($\Delta v$),
    the absolute value of the engine speed ($n_0$), or
    the absolute value of the vehicle speed ($v_0$).

4. Control device as claimed in claim 2, comprising:
    a proportional-plus-integral controller that adjusts the simulated engine drag torque as a function of at least one of the following:
    the engine speed increase ($\Delta n$),
    the vehicle speed increase ($\Delta v$),
    the absolute value of the engine speed ($n_0$), or
    the absolute value of the vehicle speed ($v_0$).

5. Control device as claimed in claim 1, wherein the simulated engine drag torque is suppressed from commencing until an actual differential value reaches a minimum threshold engine speed value ($n_1$) or a minimum threshold vehicle speed value ($v_1$).

6. Control device as claimed in claim 1,
    wherein the engine brake current ($I_B$) increases in accordance with increasing engine speed in a first engine speed range ($n_1<n<n_2$) or in accordance with increasing vehicle speed in a first vehicle speed range ($v_1<v<v_2$), and
    wherein, after reaching a maximum engine brake speed ($I_{Bmax}$), the engine brake current is essentially constant in a second engine speed range ($n_2<n$) or in a second speed range ($v_2<v$).

7. Control device as claimed in claim 6,
    wherein the engine brake current increases linearly in the first engine speed range ($n_1<n<n_2$) or in the first vehicle speed range ($v_1<v<v_2$).

8. Control device as claimed in claim 6,
    wherein the engine brake current increases at a variable rate ($I_B=f(n;v)$) in the first engine speed range ($n_1<n<n_2$) or in the first vehicle speed range ($v_1<v<v_2$).

9. Control device as claimed in claim 1,
    wherein the engine brake current ($I_B$) increases in accordance with increasing engine speed in a first engine speed range ($n_1<n<n_2$) or in accordance with increasing vehicle speed in a first vehicle speed range ($v_1<v<v_2$), and
    wherein the engine brake current is variable in a second engine speed range ($n_2<n$) or in a second speed range ($v_2<v$).

10. Control device as claimed in claim 1, comprising:
    a proportional action controller that adjusts the simulated engine drag torque as a function of at least one of the following:
    the engine speed increase ($\Delta n$) or
    the vehicle speed increase ($\Delta v$).

11. Control device as claimed in claim 1, comprising:
    a proportional-plus-integral controller that adjusts the simulated engine drag torque as a function of at least one of the following:
    the engine speed increase ($\Delta n$) or
    the vehicle speed increase ($\Delta v$).

12. Control device for a vehicle propelled by an electric engine, providing:
    a simulated engine drag torque through control of the electric engine upon release of a previously actuated accelerator pedal or a previously actuated brake pedal of the vehicle,
    a characteristic of the simulated engine drag torque as a function of an engine brake current ($I_B$) or a parameter algebraically proportional to the engine brake current, wherein the engine brake current or the algebraically proportional parameter is variable with respect to at least one of an engine speed (n) or a vehicle speed (v), and
    an onset of the simulated engine drag torque as a function of reaching a minimum, non-zero threshold value of an engine acceleration or a vehicle acceleration after release of the accelerator pedal or the brake pedal.

13. Control device as claimed in claim 12, comprising:
    a proportional action controller that adjusts the simulated engine drag torque as a function of at least one of the following:
    the engine acceleration, and
    the vehicle acceleration.

14. Control device as claimed in claim 12, comprising:
    a proportional-plus-integral controller that adjusts the simulated engine drag torque as a function of at least one of the following:
    the engine acceleration, and
    the vehicle acceleration.

15. The method according to claim 12, wherein the actual differential value is measured from at least one of:

releasing the accelerator pedal and releasing a brake pedal of the vehicle.

16. The method according to claim 12, wherein the threshold differential value is calculated from at least one of:

releasing the accelerator pedal and releasing a brake pedal of the vehicle.

17. A method for propelling a vehicle with an electric engine, comprising:

actuating an accelerator pedal of the electric engine; and controlling the electric engine to simulate an engine drag torque, wherein an amount of the simulated engine drag torque is a function of an electrical engine brake parameter, and wherein the simulated engine drag torque is suppressed from commencing until an actual differential value reaches a threshold differential value.

18. The method according to claim 17, wherein:

the electrical engine brake parameter is an engine brake current, and the differential value comprises an increase in engine speed of the electric engine or an increase in vehicle speed of the vehicle.

19. The method according to claim 17, wherein:

the electrical engine brake parameter is an engine brake current, and the differential value comprises an engine acceleration or a vehicle acceleration.

20. A control device for a vehicle propelled by an electric engine, comprising:

a first input for at least one of a base value of a engine speed ($n_0$) or a base value of the vehicle speed ($v_0$), wherein the base value is triggered in response to an operational change in actuation of at least one of an accelerator pedal of the vehicle or a brake pedal of the vehicle;

a second input for at least one of a threshold engine speed increase value ($\Delta n$) and a threshold vehicle speed increase value ($\Delta v$);

a third input for at least one of a measured engine speed or a measured vehicle speed; and an element suppressing for a time a signal to simulate an engine drag torque based on a result of processing signals from said first, second and third inputs.

21. The control device according to claim 20, further comprising:

a controller that receives the signal and adjusts an amount of the simulated engine drag torque by applying an electrical braking parameter to the electric engine as a function of at least one of the following:

the threshold engine speed increase value ($\Delta n$), the threshold vehicle speed increase value ($\Delta v$), the base value of the engine speed ($n_0$), the base value of the vehicle speed ($v_0$), a threshold engine acceleration value, or a threshold vehicle acceleration value.

* * * * *